(12) United States Patent
Wong et al.

(10) Patent No.: US 7,664,468 B2
(45) Date of Patent: *Feb. 16, 2010

(54) WIRELESS TRANSCEIVER SYSTEM

(75) Inventors: Kwo-Jyr Wong, Tu-Cheng (TW); Mu-Jung Chiu, Tu-Cheng (TW); Jane-Yi Pieh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 581 days.

This patent is subject to a terminal disclaimer.

(21) Appl. No.: 11/510,101

(22) Filed: Aug. 25, 2006

(65) Prior Publication Data
US 2007/0224932 A1    Sep. 27, 2007

(30) Foreign Application Priority Data
Mar. 24, 2006 (TW) ............... 95110328 A

(51) Int. Cl.
H04B 1/44 (2006.01)

(52) U.S. Cl. .............. 455/78; 455/83; 455/88; 455/277.1; 455/13.4; 343/702; 343/715; 330/302; 330/305

(58) Field of Classification Search .......... 455/78, 455/83, 277.1, 13.4, 88; 330/302, 306; 343/702
See application file for complete search history.

(56) References Cited

U.S. PATENT DOCUMENTS

| | | | | |
|---|---|---|---|---|
| 6,049,702 A | * | 4/2000 | Tham et al. | 455/78 |
| 6,072,993 A | * | 6/2000 | Trikha et al. | 455/78 |
| 6,108,526 A | * | 8/2000 | van der Plas | 455/78 |
| 6,266,545 B1 | * | 7/2001 | Backman et al. | 455/572 |
| 6,356,536 B1 | * | 3/2002 | Repke | 370/282 |
| 7,092,679 B2 | * | 8/2006 | Khorram | 455/78 |
| 7,120,465 B2 | * | 10/2006 | Skarby et al. | 455/561 |
| 2001/0015706 A1 | | 8/2001 | Judd | |
| 2005/0250541 A1 | | 11/2005 | Bird et al. | |

FOREIGN PATENT DOCUMENTS

| | | |
|---|---|---|
| CN | 1571551 A | 1/2005 |
| CN | 1700746 A | 11/2005 |
| JP | 2002290263 A | 10/2002 |
| TW | 496059 | 7/2002 |

* cited by examiner

*Primary Examiner*—Marceau Milord
(74) *Attorney, Agent, or Firm*—Wei Te Chung

(57) ABSTRACT

A wireless transceiver system, for compensating a transport loss, includes an antenna (300), a transceiver (100), a tower mounted amplifier (TMA) (200), and a transport loss detector (400). The transceiver transmits a first signal at a transmit power. The first signal is changed into a second signal after the cable attenuation from the transceiver. The TMA, connected to the transceiver via a cable, receives the second signal and amplifies the second signal. The transport loss detector, connected between the TMA and the transceiver, detects a transmission state of the transceiver, and calculates a transport loss between the transceiver and the TMA. The TMA transmits signals to the antenna or receives signals from the antenna according to the detected result of the transport loss detector, and compensates the transport loss according to the calculated result of the transport loss detector.

19 Claims, 3 Drawing Sheets

WIRELESS TRANSCEIVER SYSTEM

BACKGROUND OF THE INVENTION

1. Field of the Invention

The invention relates to communication systems, and particularly to a wireless transceiver system.

2. Description of Related Art

FIG. 1 is a schematic diagram of a conventional wireless transceiver system. The conventional wireless transceiver system includes a transceiver 10, a tower mounted amplifier (TMA) 20, and an antenna 30. The antenna 30 and the TMA 20 are located on an outdoor tower outside a building, and the TMA 20 is connected to the antenna 30. The transceiver 10 is disposed inside the building. The transceiver 10 is connected to the TMA 20 via a cable. Therefore, there is a transport loss between the transceiver 10 and the TMA 20. The transport loss includes a cable loss and a connector loss.

The transport loss between the transceiver 10 and the TMA 20 cannot be accurately measured, so the TMA 20 cannot accurately compensate the transport loss. As a result, an output power of the TMA 20 may exceed a legal power limit, and the TMA 20 may work in a non-linear region. Therefore, the efficiency of the wireless transceiver system is lowered.

SUMMARY OF THE INVENTION

An exemplary embodiment of the present invention provides a wireless transceiver system that compensates a transport loss. The wireless transceiver system includes an antenna, a transceiver, a tower mounted amplifier (TMA), and a transport loss detector. The transceiver transmits a first signal at a transmit power. The first signal is changed into a second signal after the cable attenuation from the transceiver. The TMA, connected to the transceiver via a cable, receives the second signal from the transceiver, and amplifies the second signal. The transport loss detector, connected between the TMA and the transceiver, detects a transmission state of the transceiver, and calculates a transport loss between the transceiver and the TMA. The transport loss detector includes a first radio frequency (RF) power detector and a controller. The first RF power detector detects the transmission state of the transceiver, and detects the second signal power. The controller calculates the transport loss between the transceiver and the TMA according to the second signal power and the transmit power of the transceiver. The TMA further transmits signals to the antenna or receives signals from the antenna according to the detected result of the first RF power detector, and compensates the transport loss between the transceiver and the TMA according to the calculated result of the controller.

Other advantages and novel features will become more apparent from the following detailed description when taken in conjunction with the accompanying drawings, in which:

DETAILED DESCRIPTION OF THE INVENTION

Figure 1:
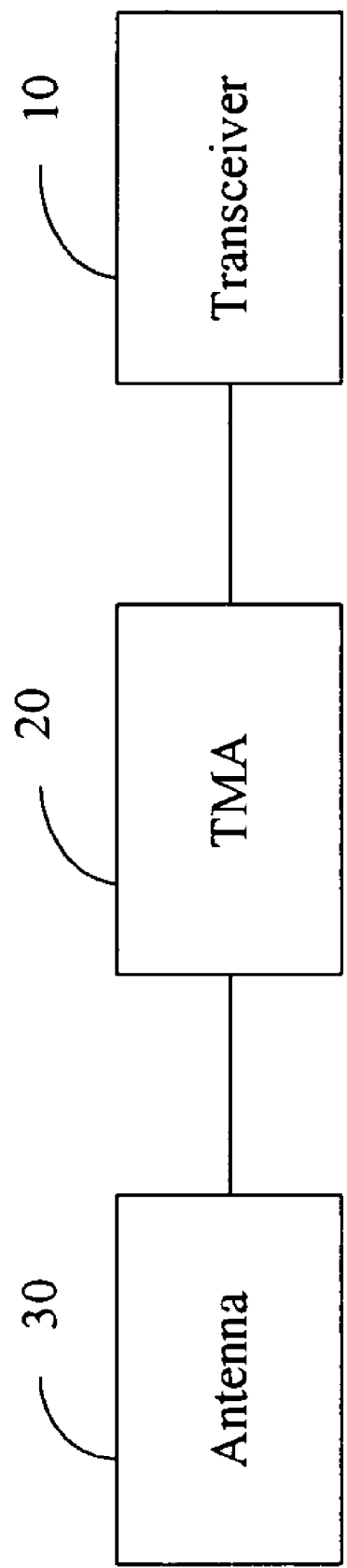
FIG. 1 is a schematic diagram of a conventional wireless transceiver system.
Figure 2:
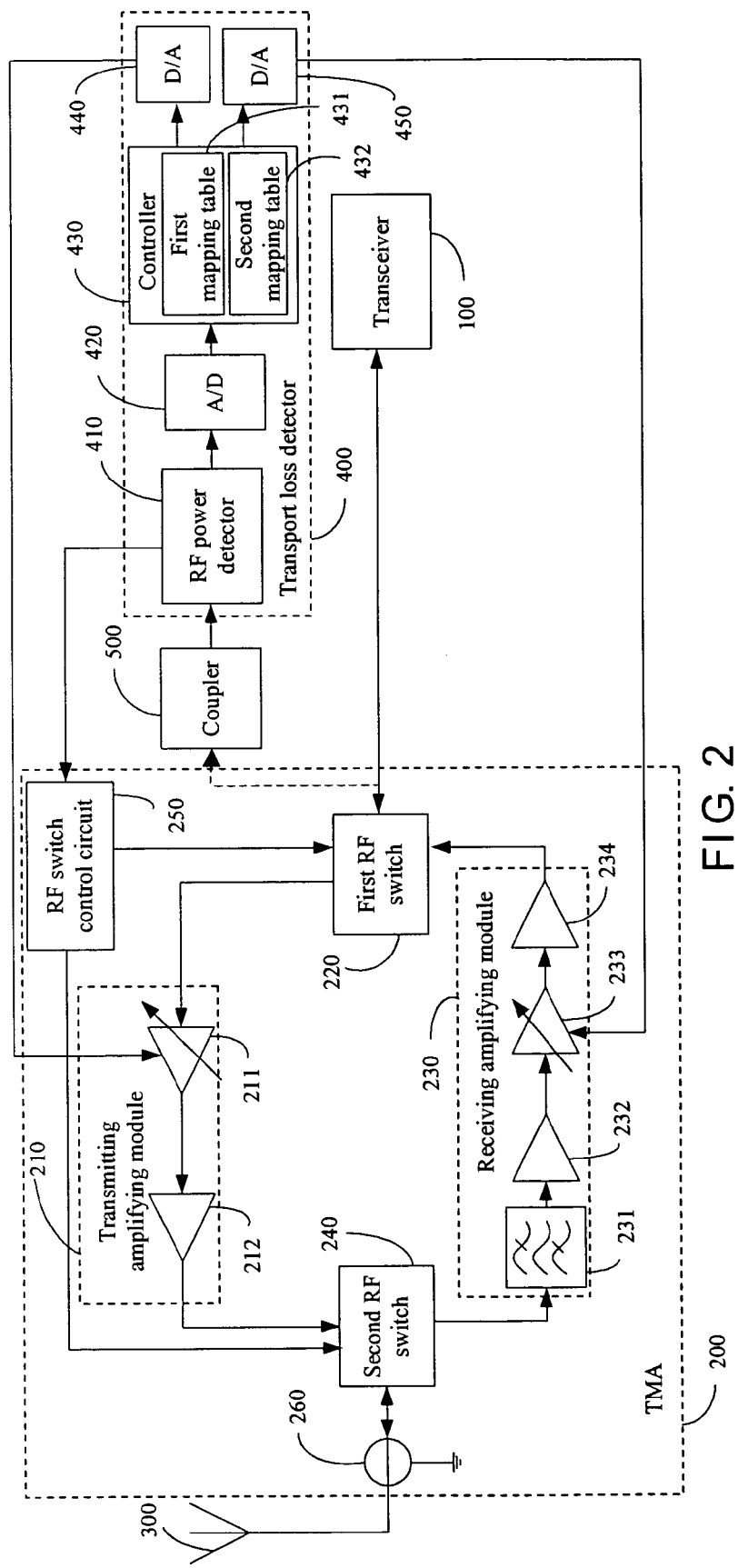
FIG. 2 is a schematic diagram of functional modules of a wireless transceiver system of an exemplary embodiment of the present invention.

FIG. 2 is a schematic diagram of functional modules of a wireless transceiver system of an exemplary embodiment of the present invention. In the exemplary embodiment, the wireless transceiver system is in a time division duplex (TDD) mode. The wireless transceiver system can accurately compensate a transport loss. The wireless transceiver system includes a transceiver 100, a tower mounted amplifier (TMA) 200, an antenna 300, and a transport loss detector 400. The antenna 300 and the TMA 200 are located on an outdoor tower outside a building, and the TMA 200 is connected to the antenna 300. The transceiver 100 is disposed indoors, i.e., inside the building. The transceiver 100 is connected to the TMA 200 via a cable. Therefore, there is a transport loss between the transceiver 100 and the TMA 200. In the exemplary embodiment, the transport loss includes a cable loss and a connector loss. In other embodiments, the transport loss may include other losses.

The antenna 300 transmits and receives signals. The transceiver 100 transmits a first signal to the TMA 200 at a transmit power. Due to the transport loss between the transceiver 100 and the TMA 200, the first signal is changed into a second signal after cable attenuation from the transceiver 100. Namely, the difference between the transmit power of the transceiver 100 and the second signal power is the transport loss between the transceiver 100 and the TMA 200.

The TMA 200 receives the second signal from the transceiver 100, and amplifies the second signal to a third signal. Then, the third signal is transmitted via the antenna 300. The transport loss detector 400, connected between the transceiver 100 and the TMA 200, detects a transmission state of the transceiver 100, and transmits the detected result to the TMA 200. The TMA 200 transmits signals to the antenna 300 or receives signals from the antenna according to the detected result of the transport loss detector 400. The transport loss detector 400 further calculates the transport loss between the transceiver 100 and the TMA 200, namely calculating the difference between the transmit power of the transceiver 100 and the second signal power. The transport loss detector 400 may be included in a finished product of TMA 200. The TMA 200 further compensates the transport loss between the transceiver 100 and the TMA 200 according to the calculated result of the transport loss detector 400.

The TMA 200 includes a transmitting amplifying module 210, a first radio frequency (RF) switch 220, a receiving amplifying module 230, and a second RF switch 240, a RF switch control circuit 250, and a lightning arrester 260. The RF switch control circuit 250, connected to the transport loss detector 400, controls the TMA 200 to transmit signals to the antenna 300 or receive signals from the antenna 300 according to the detected result of the transport loss detector 400, namely controlling connection states of the first RF switch 220 and the second RF switch 240.

The first RF switch 220, under control of the RF switch control circuit 250, connects the transceiver 100 and the transmitting amplifying module 210, or connects the receiving amplifying module 230 and the transceiver 100. When switched to connection between the transceiver 100 and the transmitting amplifying module 210, the fist RF switch 220 transmits signals from the transceiver 100 to the transmitting amplifying module 210. When switched to connection between the receiving amplifying module 230 and the transceiver 100, the first RF switch 220 transmits signals from the receiving amplifying module 230 to the transceiver 100.

The second RF switch 240, under control of the RF switch control circuit 250, connects the transmitting amplifying module 210 and the lighten arrester 260, or connects the lightning arrester 260 and the receiving amplifying module 230. When the transmitting amplifying module 210 and the lighten arrester 260 are connected, the second RF switch 240 transmits signals from the transmitting amplifying module 210 to the antenna 300 via the lightning arrester 260. When the lightning arrester 260 and the receiving amplifying module 230 are connected, the second RF switch 240 transmits signals from the antenna 300 to the receiving amplifying module 230 via the lightning arrester 260. The lightning arrester 260, connected between the antenna 300 and the second RF switch 240, protects the TMA 200 from damage in the event of a lightning strike.

The transmitting amplifying module 210, connected between the first RF switch 220 and the second RF switch 240, amplifies the second signal to the third signal. Then, the third signal is transmitted via the antenna 300. In the exemplary embodiment, the transmitting amplifying module 210 includes a variable gain amplifier (VGA) 211 and a fixed gain amplifier (FGA) 212.

In other embodiments, the transmitting amplifying module 210 may omit amplifiers, and further include other filters or other type of amplifiers.

The VGA 211, connected to the first RF switch 220, amplifies the second signal. The FGA 212, connected between the VGA 211 and the second RF switch 240, amplifies signals from the VGA 211.

The receiving amplifying module 230, connected between the first RF switch 220 and the second RF switch 240, amplifies signals from the antenna 300, and transmits the amplified signals to the transceiver 100 via the cable. In the exemplary embodiment, the receiving amplifying module 230 includes a filter 231, a low noise amplifier (LNA) 232, a VGA 233, and a FGA 234.

In other embodiments, the receiving amplifying module 230 may include other types of filters or amplifiers such as a low power amplifier (LPA).

The filter 231, connected to the second RF switch 240, filters signals from the antenna 300 to acquire useful signals. The LNA 232, connected to the filter 231, amplifies signals from the filter 231. The VGA 233, connected to the LNA 232, amplifies signals from the LNA 232. The FGA 234, connected between the VGA 233 and the first RF switch 220, amplifies signals from the VGA 233.

In the exemplary embodiment, the wireless transceiver system further includes a coupler 500. The coupler 500, coupled between the first RF switch 220 and the transceiver 100, and connected to the transport loss detector 400, couples the second signal to the transport loss detector 400. The coupler 500 may also be included the finished product of the TMA 200. In this embodiment, the coupler 500 is a directional coupler. In other embodiments, the coupler 500 may be other type of couplers.

The transport loss detector 400, connected between the TMA 200 and the transceiver 100 via the coupler 500, detects the transmission state of the transceiver 100, and calculates the transport loss between the transceiver 100 and the TMA 200. In the exemplary embodiment, the transport loss detector 400 includes a radio frequency (RF) power detector 410, an analog/digital (A/D) converter 420, a controller 430, and two digital/analog (D/A) converters 440, 450.

The RF power detector 410, connected to the coupler 500, detects the transmission state of the transceiver 100, and transmits the detected result to the RF switch control circuit 250. The RF switch control circuit 250 controls the first RF switch 220 and the second RF switch 240 according to the detected result of the RF power detector 410. In the exemplary embodiment, when detecting the second signal, the RF power detector 410 detects the transceiver 100 is transmitting signals. In such case, the RF switch control circuit 250 controls the first RF switch 220 to connect the transceiver 100 and the transmitting amplifying module 210, and the second RF switch 240 to connect the transmitting amplifying module 210 and the lightning arrester 260. When not detecting the second signal, the RF power detector 410 detects the transceiver 100 is not transmitting signals. In such case, the RF switch control circuit 250 controls the second RF switch 240 to connect the lightning arrester 260 and the receiving amplifying module 210, and the first RF switch 220 to connect the receiving amplifying module 230 and the transceiver 100.

The RF power detector 410 further detects the second signal power, and converts the second signal power to a first analog signal. In the exemplary embodiment, the first analog signal is a voltage signal. In another exemplary embodiment, the first analog signal may be a current signal.

The A/D converter 420, connected to the RF power detector 410, converts the first analog signal to a first digital signal.

The controller 430 calculates the transport loss between the transceiver 100 and the TMA 200 according the second signal power and the transmit power of the transceiver 100. In the exemplary embodiment, the controller 430 is a micro controller. The controller 430, connected to the A/D converter 420, calculates the transport loss between the transceiver 100 and the TMA 200 according to the first digital signal and the transmit power of the transceiver 100.

In the exemplary embodiment, the transmit power of the transceiver 100 is recognizable by the controller 430. The controller 430 can know the transmit power of the transceiver 100 according to the attributes of the transceiver 100, for example, a model type of the transceiver 100.

In another exemplary embodiment, the transmit power of the transceiver 100 may be unknown. The transport loss detector 400 can be connected to the transceiver 100 via an existing cable, before the wireless transceiver system is set up. In this embodiment, the existing cable is a very short cable, and a cable loss thereof is insignificant and previously known. The transceiver 100 transmits a fourth signal to the transport loss detector 400 via the existing cable at the transmit power of the transceiver 100. The transport loss detector 400 receives a fifth signal. The fourth signal is changed to the fifth signal after attenuation by the existing cable from the transceiver 100. Therefore, the transmit power of the transceiver 100 is the sum of the fifth signal power and the cable loss of the existing cable. The controller 430 detects the fifth signal power via the RF power detector 410 and the A/D converter 420, and then calculates the sum of the fifth signal power and the cable loss of the existing cable to obtain the transmit power of the transceiver 100.

In the exemplary embodiment, the controller 430 can know the second signal power according to the first digital signal. The difference between the transmit power of the transceiver 100 and the second signal power is the transport loss between the transceiver 100 and the TMA 200, so the controller 430 can calculate the transport loss between the transceiver 100 and the TMA 200 according to the first digital signal and the transmit power of the transceiver 100.

In the exemplary embodiment, the controller 430 stores a first mapping table 431 and a second mapping table 432. The first mapping table 431 includes a mapping relation between control signals and gains of the VGA 211. The relation between control signals and gains of the VGA 211 is a linear relationship.

In other embodiments, the relation between control signals and gains may not be a linear relationship.

In the exemplary embodiment, the controller 430 generates a first digital control signal according to the first mapping table 431 and the transport loss between the transceiver 100 and the TMA 200. For example, if the mapping relation between the control signals and gains of the VGA 211 is as follows: control voltages (namely control signals) 0V-10V corresponding to gains 0 dB-10 dB, and the transport loss from the transceiver 100 to the TMA 200 is 6 dB, the first digital control signal must be 6 volts.

The second mapping table 432 includes a mapping relation between control signals and gains of the VGA 233. The relation between control signals and gains of the VGA 233 is a linear relationship.

In other embodiments, the relation between control signals and gains of the VGA 233 may not be a linear relationship. The controller 430 may not store the first mapping table 431 and the second mapping table 432, but only store the relation between control signals and gains of the VGA 211 and the relation between control signals and gains of the VGA 233.

In the exemplary embodiment, the controller 430 further generates a second digital control signal according to the second mapping table 432 and the transport loss between the transceiver 100 and the TMA 200. The controller 430 needs to continuously provide the second digital control signal for the VGA 233, so that the VGA 233 can pre-compensate the transport loss from the TMA 200 to the transceiver 100 for received signals when the TMA 200 receives signals.

The D/A converter 440 converts the first digital control signal to a first analog control signal. In the exemplary embodiment, the first analog control signal is a voltage signal. In another exemplary embodiment, the first analog control signal may be a current signal.

The D/A converter 450 converts the second digital control signal to a second analog control signal. In the exemplary embodiment, the second analog control signal is a voltage signal. In another exemplary embodiment, the second analog control signal may be a current signal.

The TMA 200 further compensates the transport loss from the transceiver 100 to the TMA 200 according to the first analog control signal, and pre-compensates the transport loss from the TMA 200 to the transceiver 100 according to the second analog control signal. In the exemplary embodiment, when the wireless transceiver system sends signals, the VGA 211 compensates the transport loss from the transceiver 100 to the TMA 200. In the above example, the VGA 200 compensates for a 6 dB transport loss according to the 6V voltage. When the wireless transceiver system receives signals, the VGA 233 pre-compensates the transport loss from the TMA 200 to the transceiver 100 according to the second analog control signal.

Figure 3:
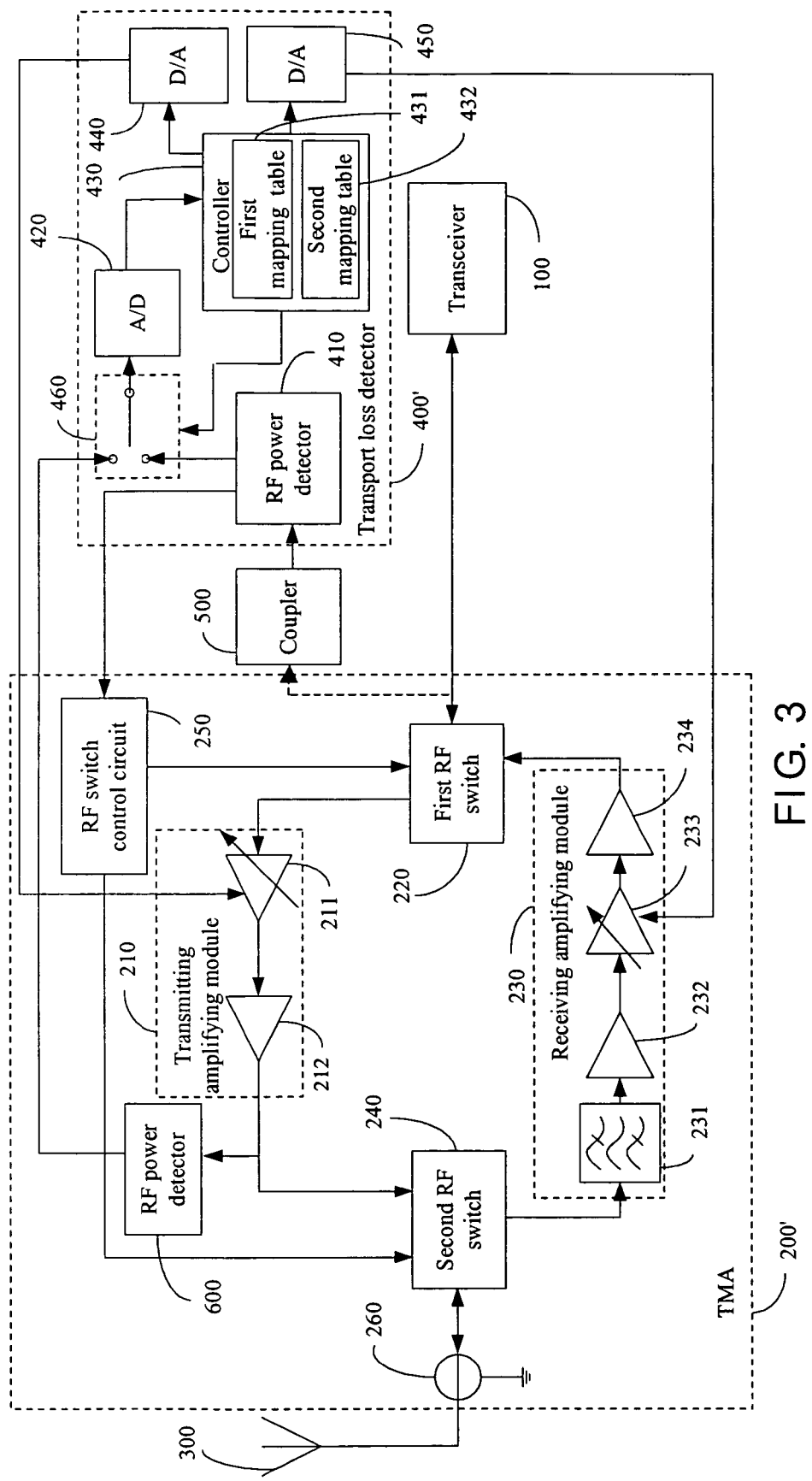
FIG. 3 is a schematic diagram of functional modules of a wireless transceiver system of another exemplary embodiment of the present invention.

FIG. 3 is a schematic diagram of functional modules of a wireless transceiver system of another exemplary embodiment of the invention. The wireless transceiver system of this embodiment is similar to the wireless transceiver system of FIG. 2. The difference therebetween is that a TMA 200' further includes a RF power detector 600, and a transport loss detector 400' further includes a switch 460. Other modules of this embodiment are the same as that of FIG. 2, so descriptions are omitted.

In the exemplary embodiment, the wireless transceiver system further monitors an output power of the TMA 200' via the transport loss detector 400'. During a system setup stage of the wireless transceiver system, the transport loss detector 400' calculates the transport loss between the transceiver 100 and the TMA 200'. At other stages, the transport loss detector 400' monitors the output power of the TMA 200'. The transport loss between the transceiver 100 and the TMA 200' may be changed due to unplanned circumstances, e.g. typhoon, or too long a period of use. Therefore, the transport loss detector 400' calculates the transport loss between the transceiver 100 and the TMA 200' again after the circumstances, or when needing periodic check-ups. After calculating, the transport loss detector 400' goes on to monitor the output power of the TMA 200'.

The switch 460, connected among the A/D converter 420, the RF power detector 410, and the RF power detector 600, is controlled by the controller 430 to connect the RF power detector 410 and the A/D converter 420, or connect the RF power detector 600 and the A/D converter 420. When the switch 460 connects the RF power detector 410 and the A/D converter 420, the transport loss detector 400' calculates the transport loss between the transceiver 100 and the TMA 200'. When the switch 460 connects the RF power detector 600 and the A/D converter 420, the transport loss detector 400' monitors the output power of the TMA 200'. Thus, the controller 430 can control the transport loss detector 400' to calculate the transport loss between the transceiver 100 and the TMA 200', or monitor the output power of the TMA 200' according to different requirements.

In the exemplary embodiment, the second signal is amplified to the third signal by the transmitting amplifying module 210. The third signal power is equal to the output power of the TMA 200'.

The RF power detector 600, connected between the transmitting amplifying module 210 and the second RF switch 240, detects the third signal power, and converts the third signal power to a second analog signal. In the exemplary embodiment, the second analog signal is a voltage signal. In another exemplary embodiment, the second analog signal may be a current signal.

The A/D converter 420 converts the second analog signal to a second digital signal.

The controller 430 monitors the output power of the TMA 200' according to a legal power limit and the second digital signal, namely monitoring the output power of the transmitting amplifying module 210. The legal power limit is a maximal output power of the TMA 200' regulated by a protocol or a standard, e.g. the Institute of Electrical and Electronics Engineers (IEEE) 802.11a/b/g. In the exemplary embodiment, the controller 430 can know the output power of the TMA 200' according to the second digital signal. Then the controller 430 compares the legal power limit and the output power of the TMA 200'. If the output power of the TMA 200' exceeds the legal power limit, the controller 430 generates a third digital control signal to adjust the gain of the TMA 200' according to the legal power limit, the second digital signal, and the first mapping table 431. For example, if the output power of the TMA 200' exceeds the legal power limit by 2 dB, the gain of the VGA 211 must be lowered by 2 dB in order to make the output power of the TMA 200' not exceed the legal power limit. If the current gain of the VGA 211 is 6 db, the gain of the VGA 211 must be 4 db in order to lower the gain of the VGA 211 by 2 db. If the mapping relation between the control signals and the gains of the VGA 211 is as follows: control signals 0V-10V corresponding to gains 0 dB-10 dB, the third digital control signal must be 4 volts.

The D/A converter 440 converts the third digital control signal to a third analog control signal. In the exemplary embodiment, the third analog control signal is a voltage signal. In another embodiment, the third analog control signal may be a current signal.

The TMA 200' adjusts the gain thereof according to the third analog control signal, in order to make output power thereof not exceed the legal power limit. In the above example, the VGA 211 lowers the output power thereof according to the third analog control signal. Then, the output power of the TMA 200' does not exceed the legal power limit again. Thus, the output power of the TMA 200' is effectively monitored.

In the wireless transceiver system of this embodiment, the transport loss detector 400' accurately calculates the transport loss between the transceiver 100 and the TMA 200', and then the TMA 200' accurately compensates the calculated transport loss. Therefore, the efficiency of the wireless transceiver system is improved.

In addition, the transport loss detector 400' further monitors the output power of the TMA 200'. Thus, the efficiency of the wireless transceiver system is further improved.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A wireless transceiver system, for compensating a transport loss, comprising:
   an antenna;
   a transceiver, for transmitting a first signal at a transmit power; wherein the first signal is changed into a second signal after cable attenuation from the transceiver;
   a tower mounted amplifier (TMA), connected to the transceiver via a cable, for receiving the second signal from the transceiver and amplifying the second signal; and
   a transport loss detector, connected between the TMA and the transceiver, for detecting a transmission state of the transceiver, and calculating a transport loss between the transceiver and the TMA, the transport loss detector comprising:
      a first radio frequency (RF) power detector, for detecting the transmission state of the transceiver, and detecting the second signal power; and
      a controller, for calculating the transport loss between the transceiver and the TMA according to the second signal power and the transmit power of the transceiver;
   wherein the TMA further transmits signals to the antenna or receives signals from the antenna according to the detected result of the first RF detector, and compensates the transport loss between the transceiver and the TMA according to the calculated result of the controller.

2. The wireless transceiver system as claimed in claim 1, wherein the first RF power detector converts the second signal power to a first analog signal; the transport loss detector further comprises an analog/digital (A/D) converter, for converting the first analog signal to a first digital signal; the controller calculates the transport loss between the transceiver and the TMA according to the first digital signal and the transmit power of the transceiver.

3. The wireless transceiver system as claimed in claim 1, further comprising a coupler, coupled between the TMA and the transceiver, and connected to the first RF power detector, for coupling the second signal to the first RF power detector.

4. The wireless transceiver system as claimed in claim 1, wherein the TMA comprises a transmitting amplifying module, for amplifying the second signal and transmitting the amplified signal via the antenna.

5. The wireless transceiver system as claimed in claim 4, wherein the transmitting amplifying module comprises a first variable gain amplifier (VGA); the controller stores a relation between control signals and gains of the first VGA; the controller generates a first digital control signal according to the relation and the transport loss between the transceiver and the TMA.

6. The wireless transceiver system as claimed in claim 5, wherein the transport loss detector further comprises a digital/analog (D/A) converter, for converting the first digital control signal to a first analog control signal; the first VGA compensates the transport loss from the transceiver to the TMA according to the first analog control signal.

7. The wireless transceiver system as claimed in claim 4, wherein the TMA further comprises a receiving amplifying module, for amplifying signals from the antenna and transmitting the amplified signals to the transceiver via the cable.

8. The wireless transceiver system as claimed in claim 7, wherein the receiving amplifying module comprises a second variable gain amplifier (VGA); the controller stores a relation between control signals and gains of the second VGA; the controller generates a second digital control signal according to the relation and the transport loss between the transceiver and the TMA.

9. The wireless transceiver system as claimed in claim 8, wherein the transport loss detector further comprises a digital/analog (D/A) converter, for converting the second digital control signal to a second analog control signal; the second VGA pre-compensates the transport loss from the TMA to the transceiver according to the second analog control signal.

10. The wireless transceiver system as claimed in claim 7, wherein the TMA further comprises a RF switch control circuit, connected to the first RF power detector, for controlling the transceiver to transmit signals to the antenna or receive signals from the antenna according to the detected result of the first RF power detector.

11. The wireless transceiver system as claimed in claim 10, wherein the TMA further comprises a first RF switch, under control of the RF switch control circuit, for switching connection between the transceiver and the transmitting amplifying module to connection between the receiving amplifying module and the transceiver.

12. The wireless transceiver system as claimed in claim 11, further comprising a coupler, coupled between the transceiver and the first RF switch, and connected to the first RF power detector, for coupling the second signal to the first RF power detector.

13. The wireless transceiver system as claimed in claim 11, wherein the TMA further comprises a second RF switch, under control of the RF switch control circuit, for switching connection between the transmitting amplifying module and the antenna to connection between the antenna and the receiving amplifying module.

14. The wireless transceiver system as claimed in claim 1, wherein the second signal is amplified to a third signal via the TMA, and the TMA further comprises a second RF power detector, for detecting the third signal power, and converting the third signal power to a second analog signal.

15. The wireless transceiver system as claimed in claim 14, wherein the transport loss detector further comprises an analog/digital (A/D) converter and a switch controlled by the controller to connect the first RF power detector and the A/D converter or connect the second RF power detector and the A/D; the A/D converter converts the second analog signal to a second digital signal; the controller monitors an output power of the TMA according to a legal power limit and the second digital signal.

16. The wireless transceiver system as claimed in claim 15, wherein the TMA further comprises a first variable gain amplifier (VGA); the controller stores a relation between control signals and gains of the first VGA; the controller generates a third digital control signal according to the legal power limit, the second digital signal, and the relation.

17. The wireless transceiver system as claimed in claim 16, wherein the transport loss detector further comprises a digital/analog (D/A) converter, for converting the third digital control signal to a third analog control signal; the first VGA adjusts the gain of the first VGA according to the third analog control signal.

18. The wireless transceiver system as claimed in claim 1, the wireless transceiver system is in a time division duplex (TDD) mode.

19. A wireless transceiver system comprising: an antenna installable on an outdoor tower; a tower mounted amplifier (TMA) installable on said outdoor tower beside said antenna and electrically communicable with said antenna for signal amplification; a transceiver installable indoors and electrically communicable with said TMA via a cable for signal transmission therebetween; and a transport loss detector installable on said outdoor tower beside said TMA and electrically communicable with said TMA to detect said signal transmission state of the transceiver and the signal power between said TMA and said transceiver, and to calculate a transport loss between the transceiver and the TDA according to said signal power and the transmit power of the transceiver so as to control said TMA for transmitting signals to said antenna or receiving signals from said antenna according to the detected result of the transport loss detector and for precisely compensating the transport loss generated during said signal transmission between said TMA and said transceiver according to the calculated result of the transport loss detector.

* * * * *

UNITED STATES PATENT AND TRADEMARK OFFICE
CERTIFICATE OF CORRECTION

PATENT NO. : 7,664,468 B2  Page 1 of 1
APPLICATION NO. : 11/510101
DATED : February 16, 2010
INVENTOR(S) : Wong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Thirtieth Day of November, 2010

David J. Kappos
*Director of the United States Patent and Trademark Office*